United States Patent
Häffner et al.

(10) Patent No.: US 8,629,237 B2
(45) Date of Patent: Jan. 14, 2014

(54) SIMPLIFIED PRODUCTION OF NYLON-6

(71) Applicant: BASF SE, Ludwigshafen (DE)

(72) Inventors: Rüdiger Häffner, Neustadt (DE); Faissal-Ali El-Toufaili, Ludwigshafen (DE); Achim Stammer, Freinsheim (DE); Rolf-Egbert Grützner, Rudolstadt (DE); Angela Ulzhöfer, Ludwigshafen (DE); Jens Becker, Eisenberg (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/682,091

(22) Filed: Nov. 20, 2012

(65) Prior Publication Data
US 2013/0131305 A1    May 23, 2013

Related U.S. Application Data

(60) Provisional application No. 61/561,942, filed on Nov. 21, 2011.

(51) Int. Cl.
*C08G 63/02* (2006.01)
*C08G 64/00* (2006.01)

(52) U.S. Cl.
USPC .......................................... 528/318; 530/412

(58) Field of Classification Search
USPC .......................................... 528/318; 530/412
See application file for complete search history.

(56) References Cited

U.S. PATENT DOCUMENTS

| | | | |
|---|---|---|---|
| 4,053,457 A | 10/1977 | Cordes et al. | |
| 5,039,786 A | 8/1991 | Pipper et al. | |
| 5,674,973 A | 10/1997 | Pipper et al. | |
| 6,326,457 B1 | 12/2001 | Erbes et al. | |
| 2003/0000100 A1 | 1/2003 | Ludwig et al. | |
| 2003/0199635 A1* | 10/2003 | Court et al. | 525/178 |
| 2004/0054123 A1* | 3/2004 | Tachibana et al. | 528/323 |
| 2008/0033143 A1* | 2/2008 | Tachibana et al. | 528/324 |
| 2009/0053114 A1 | 2/2009 | Kampf et al. | |
| 2011/0092645 A1 | 4/2011 | Loth et al. | |

FOREIGN PATENT DOCUMENTS

| | | |
|---|---|---|
| DE | 2501348 A1 | 7/1976 |
| DE | 2732328 A1 | 2/1979 |
| DE | 43 21 683 A1 | 1/1995 |
| DE | 19957664 A1 | 5/2001 |
| EP | 0284986 A2 | 10/1988 |
| EP | 0393546 A1 | 10/1990 |
| WO | WO-99/26996 A2 | 6/1999 |
| WO | WO-2006050799 A1 | 5/2006 |
| WO | WO-2009153340 A1 | 12/2009 |

OTHER PUBLICATIONS

Kunststoff-Handbuch, et al., "Technische Thermoplaste Polyamide", 3.4 ed., (1998), p. 2, 43-49, 64-71, 74-75.

* cited by examiner

*Primary Examiner* — Terressa Boykin
(74) *Attorney, Agent, or Firm* — Novak Druce Connolly Bove + Quigg LLP

(57) ABSTRACT

A process for producing polyamides from the corresponding monomers and/or prepolymers comprises the steps of
  (a) reacting the monomers and/or prepolymers and optionally further components under polyamide-forming reaction conditions to form polyamide,
  (b) treating the polyamide obtained in step (a) in a kneader above the melting temperature of the polyamide,
  (c) further processing the polyamide from step (b) into pellet, film, fiber or moldings, preferably pelletizing the polyamide,
  (d) extracting some or all unconverted monomers and any product dimers and oligomers and also optionally further components from the polyamide and/or drying the polyamide.

17 Claims, No Drawings

SIMPLIFIED PRODUCTION OF NYLON-6

CROSS-REFERENCE TO RELATED APPLICATIONS

This application claims the benefit of U.S. Provisional Application No. 61/561,942, filed Nov. 21, 2011, which is incorporated herein by reference.

The present invention relates to a simplified process for producing polyamides wherein the polyamide is treated in a kneader after polymerization.

Polyamides typically have a certain residual-monomer content in their as-polymerized state. For instance, the polymerization of caprolactam to form nylon-6 (PA 6) is known to give rise to a temperature-dependent equilibrium at which the polyamide comprises about 9 to 13 wt % of low molecular weight constituents such as caprolactam monomer, caprolactam dimer and caprolactam oligomer. These low molecular weight constituents, hereinafter also referred to as extractables, change the properties of the polyamide in an undesired manner. Therefore they have to be removed before further processing the polyamide. Polyamides, especially nylon-6, are therefore typically pelletized after polymerization and the pellets extracted with water in order that remaining monomers, dimers and oligomers may be removed. This is frequently accomplished via continuous or batchwise extraction with hot water (DE 25 01 348 A, DE 27 32 328 A) or else, in the case of nylon-6, with caprolactam-containing water (WO 99/26996 A2) or via treatment in superheated steam (EP 0 284 986 A1). The extractables, especially caprolactam in the case of nylon-6, are recycled into the process for ecological as well as economic reasons. Process temperature is in the range from 95 to 98° C. and residence time in the range from 18 to 24 hours. A customary extraction of polyamide involves a process temperature of 95 to 98° C. and a residence time of 18 to 24 h (see Kunststoff-Handbuch 3.4, editors G. W. Becker, D. Braun, Carl Hanser Verlag Munich 1998, page 69). After extraction, the extracted polyamide is typically dried.

Polyamides polymerized by condensation polymerization frequently require that the water formed in the course of the condensation polymerization be removed from the polyamide by drying for example.

There are many uses where polyamides need to have comparatively high molecular weights that cannot be achieved via polymerization alone. Postcondensation is then carried out to increase polyamide molecular weight/viscosity, preferably with the polyamide in the solid state. Postcondensation and drying are frequently carried out in one step (WO 2009/153340 A1, DE 199 57 664 A1). Nylon-6 having a relative viscosity of 2.8 for example can be boosted to a relative viscosity of 3.8 via a 24-hour treatment at 185° C. (see Kunststoff-Handbuch 3.4, editors G. W. Becker, D. Braun, Carl Hanser Verlag Munich 1998, pages 46 to 47).

The process stages of extraction, drying and solid-state condensation each have comparatively long residence times, each in the range from several hours up to days-several days when all the steps of extraction, drying and solid-state condensation are carried out in particular. This is comparatively costly.

It was an object of the present invention to provide a process for producing polyamides wherein the residence times of the polyamide in the process steps for aftertreatment after polymerization has taken place are shorter.

We have found that this object is achieved according to the present invention by the following process for producing polyamides from the corresponding monomers and/or prepolymers comprising the steps of (a) reacting the monomers and/or prepolymers and optionally further components under polyamide-forming reaction conditions to form polyamide,
(b) treating the polyamide obtained in step (a) in a kneader above the melting temperature of the polyamide,
(c) further processing the polyamide from step (b) into pellet, film, fiber or moldings,
(d) optionally extracting some or all unconverted monomers and any product dimers and oligomers and also optionally further components from the polyamide and/or drying the polyamide.

Step (b) comprises treating the polyamide in a kneader above a melting temperature of the polyamide. The polyamide becomes postcondensed to higher molecular weights with correspondingly increased viscosities. Surprisingly, the postcondensation to higher molecular weights proceeds more rapidly under the conditions in the kneader than the chain degradation expected to take place at the comparatively high temperatures and/or the retroreactions of the condensation polymerization. The postcondensation in step (b) of the process according to the present invention takes place distinctly faster than in the existing postcondensation processes carried out as a solid-state reaction subsequent to a possible extraction. This otherwise necessary postcondensation can be omitted to some extent at least and preferably completely, which results in a distinct time saving. It was further found that, surprisingly, the residual monomer content of the polyamide is distinctly reduced by the treatment in the kneader. One reason for the distinct reduction in residual monomer content is believed to reside in the intensive renewal of the surface in the kneading operation itself. A constantly renewed surface allows the monomers and also, if present, dimers and oligomers to escape directly without having to diffuse long distances from the interior of the polyamide. Monomer, dimer and oligomer escaping from the polyamide in step (b) in the kneader can be collected and recycled. It is particularly advantageous in this connection that the monomers, dimers and oligomers are obtained in pure form, i.e., not in the form of an aqueous solution as with the extraction, and thus are simpler to recycle into the process. Since the residual monomer content of the polyamide is already distinctly reduced in the kneader, the optionally subsequent extraction can be quicker, which again yields a time saving. When the polyamides which have been kneader treated according to the process of the present invention are additionally extracted, polyamides of very low residual monomer content are obtained.

The invention will now be more particularly described.

Step (a) of the process according to the present invention comprises reacting monomers and/or prepolymers and optionally further components under polyamide-forming reaction conditions to form polyamide.

For the purposes of the present invention, polyamides are homopolyamides, copolyamides and polyamide copolymers comprising not less than 60 wt % of polyamide foundational building blocks, based on the total weight of the polyamide's monomeric foundational building blocks. Homopolyamides are derived from one amino carboxylic acid; or one lactam; or one diamine and one dicarboxylic acid; and can be described using a single repeat unit. Nylon-6 foundational building blocks may be constructed for example from caprolactam, aminocapronitrile, aminocaproic acid or mixtures thereof. Nylon-6,6 foundational building blocks may be formed from adipic acid with hexamethylenediamine. Copolyamides derive from two or more different monomers which are each linked together through an amide bond. Possible copolyamide building blocks are derivable for example from amino carbons, dicarboxylic acids and diamines. Examples of copolyamides are polyamides formed from caprolactam, hexamethylenediamine and adipic acid (PA 6/66) or polyamides formed from hexamethylenediamine, adipic acid and sebacic acid (PA 66/610). Polyamide, copolymers in addition to the polyamide, foundational building blocks comprise further foundational building blocks that are not connected together through amide bonds. The proportion of comonomers in polyamide copolymers is preferably not more than 40 wt %, more preferably not more than 20 wt % and especially not more than 10 wt %, based on the total weight of the foundational building blocks of the polyamide copolymer.

The process according to the present invention is preferably used to produce polyamides selected from copolyamides constructed from nylon-6 foundational building blocks and further polyamide foundational building blocks, and polyamide copolymers whose polyamide, fraction are constructed from nylon-6 foundational building blocks and optionally further polyamide foundational building blocks, wherein the proportion of nylon-6 foundational building blocks is in each case not less than 20 wt %, preferably not less than 25 wt % and more preferably not less than 30 wt %, based on the total weight of polyamide-forming foundational building blocks, and nylon-6.

The process according to the present invention is more preferably used to produce a polyamide on the basis of nylon-6 which is selected from polyamides, copolyamides and polyamide copolymers comprising not less than 60 wt % of nylon-6 foundational building blocks, preferably not less than 70 wt % and more preferably not less than 80 wt % of nylon-6 foundational building blocks, based on the total weight of the polyamide's monomeric foundational building blocks.

The production of polyamides is known to a person skilled in the art. The process according to the present invention has in-principle suitability for any polyamide where a postcondensation is desired and optionally the monomer content of the polyamide is to be reduced, irrespective of the method used to produce the particular polyamide.

Polyamides are in principle obtainable from monomers selected from the group lactams, omega-amino carboxylic acids, omega-amino carbonitriles, omega-amino carboxamides, omega-amino carboxylic acid salts, omega-amino carboxylic esters, equimolar mixtures of diamines and dicarboxylic acids, dicarboxylic acid/diamine salts, dinitriles and diamines or mixtures thereof.

Useful lactams include for example caprolactam, enantholactam, undecanolactam and dodecanolactam (laurolactam). It is from these that the corresponding omega-amino carboxylic acids, omega-amino carbonitriles, omega-amino carboxamides, omega-amino carboxylic acid salts, omega-amino carboxylic esters derive, for example amino-caproic acid and its salts, aminocapronitrile, aminocaproamide and aminocaproic esters in respect of caprolactam.

Useful dicarboxylic acids include for example aliphatic $C_{4-10}$-alpha, omega-dicarboxylic acids such as succinic acid, glutaric acid, adipic acid, pimelic acid, suberic acid, azelaic acid, sebacic acid and dodecanedioic acid. It is also possible to use aromatic $C_{8-20}$-dicarboxylic acids such as terephthalic acid and isophthalic acid.

Useful diamines include alpha, omega-diamines of four to ten carbon atoms such as tetramethylenediamine, pentamethylenediamine, hexamethylenediamine, heptamethylenediamine, octamethylenethamine, nonamethylenediamine and decamethylenediamine, of which hexamethylenediamine is particularly preferred.

Among the useful salts of the dicarboxylic acids and diamines mentioned it is particularly the salt of adipic acid and hexamethylenediamine—known as 66 salt—which is preferred.

Polyamides are obtainable using one or more chain transfer agents, for example aliphatic amines or diamines such as triacetonediamine or mono- or dicarboxylic acids such as propionic acid and acetic acid or aromatic carboxylic acids such as benzoic acid and terephthalic acid.

Depending on the chain growth addition or condensation polymerization process used, prepolymers of the aforementioned monomers can also be used in step (a) of the process according to the present invention, optionally alone or combined with further monomers, preferably with polyamide-forming monomers such as caprolactam. The term prepolymer is familiar to a person skilled in the art of polyamide production. Prepolymers are typically monomers that have already been converted to higher molecular weights, but could not as yet constitute the desired final polymer.

The production of nylon-6 and nylon-6,6 is described for example in Kunststoff-Handbuch ¾ at pages 64 to 70 (editors G. W. Becker, D. Braun, Carl Hanser Verlag Munich 1998).

It is preferable according to the present invention for the monomer used in step (a) to be lactams and/or prepolymers based on lactams, optionally together with further monomers. Caprolactam is a particularly preferable lactam.

It is particularly preferable according to the present invention for the monomer used in step (a) to be lactams and/or prepolymers based on lactams and also optionally further monomers which are hydrolytically polymerized in step (a) to polyamide. Caprolactam is particularly preferable here. The hydrolytic production of polyamide from lactams is described for example in DE 43 21 683 A1. Hydrolytically in this context is to be understood as meaning that the initial step is for a lactam ring to be cleaved in the presence of water and for further monomers to condense/add onto it (see Kunststoff-Handbuch ¾, G. W. Becker, D. Braun, Carl Hanser Verlag Munich 1998 page 42).

A process for continuous production of copolyamides from caprolactam and salts of diamines and dicarboxylic acids is described in EP 0 393 546 A1.

The reaction of monomers and/or prepolymers and optionally further components under polyamide-forming reaction conditions in step (a) can be carried out in one, two or more stages.

It is further possible for the polyamides to comprise customary additives such as delusterants, for example titanium oxide, nucleators such as magnesium silicate or boron nitrite, stabilizers such as copper(I) halides and alkali metal halides, catalysts such as phosphorous acid and antioxidants in customary amounts, for example in the range from 0.01 to 5 wt % based on the amount of monomers used. Additives are generally added before, during or after the polymerization, but before step (c).

One embodiment of the present invention may in this way produce pigmented polyamides by adding pigments in stage (a) of the production process. The pigment content of polyamide is preferably in the range from 0.03 to 3 wt % and especially from 0.3 to 2 wt %, based on the entire polyamide plus pigment.

It is very particularly preferable to produce nylon-6 that contains no comonomers in its structure, but optionally includes chain transfer agents or light stabilizers in its structure.

The optional further components in step (a) are preferably the above-described additives such as chain transfer agents, catalysts, fillers, stabilizers, etc. This also includes the water typically added for the hydrolytic polymerization of lactams.

Step (b) of the process according to the present invention comprises treating the polyamide obtained in step (a) in a kneader above the melting temperature of the polyamide. The polyamide undergoes a postcondensation to higher molecular weights and the level of unconverted monomer in the polyamide decreases. One advantage of kneading is that the kneaded polyamide continually forms fresh surface area whence monomers can escape more easily and faster than from solid polyamide, for example pellet, where the monomers first have to diffuse a comparatively long way from the interior to get to the surface.

Kneaders for use in the sector of plastics processing and polymers are known in principle to a person skilled in the art and are commercially available. In contra-distinction to extruders, which typically have a residence time of below 5 minutes, the residence time in kneaders is typically at least 5 minutes. Planetary mixers, paddle mixers, single-shaft and twin-shaft screw kneaders, co-kneaders and multichamber kneaders are commercially available for example. Co-kneaders are typically single-shaft screw kneaders where the screw performs an axial traversing movement while rotating. Useful kneaders are available for example from the IKA® works (Staufen, Germany), from Buss-AG (Pratteln, Switzerland) and from List AG (Arisdorf, Switzerland). The present invention also allows the use of so-called kneading reactors of the type available from List AG (Arisdorf, Switzerland) for example or described in WO 2006/050799 A1.

Twin-shaft screw kneaders are preferred according to the present invention. They can be corotating contrarotating.

It is preferable to add at least one viscosity reducer to the polyamide before or in step (b). Useful viscosity reducers include for example ethoxylates of amines, alcohols, amides or acids of the type commercially available from BASF SE under the Lutensol® brand. The viscosity reducer is typically used in a concentration of 0.1 to 50 wt % and preferably of 5 to 20 wt %, based on the total amount of polyamide to be kneaded including viscosity reducer and further components that may be present in the polyamide such as monomers, dimers, oligomers and further additives.

The temperature in step (b) is chosen such that the polyamide is present above its melting temperature and the particular polyamide is sufficiently flowable to be kneaded in the chosen kneader. The melting temperature is about 220° C. in the case of polycaprolactam (PA 6), about 260° C. in the case of PA 6,6, about 200° C. in the case of polyundecanolactam (PA 11) and about 180° C. in the case of polylauryllactam (PA 12). Step (b) is therefore typically carried out at temperatures of 180 to 340° C., preferably of 220 to 320° C. and more preferably at 240 to 300° C.

Step (b) is typically carried out at a pressure of 0.01 bar absolute to 5 bar absolute, preferably at 0.1 to 2.5 bar absolute and more preferably at 0.5 bar absolute to 1.5 bar absolute. In a preferred embodiment of the invention step (b) is carried out in vacuo, i.e., at pressures ranging from 0.4 bar absolute to below bar absolute and preferably from 0.7 bar absolute to below 1.013 bar absolute. This is more particularly advantageous when monomers and any dimers and oligomers escaping from the polyamide are to be recovered and are to be recycled into step (a).

It is further advantageous for the treatment as per step (b) to be carried out under inert gas atmosphere since polyamide, melts are sensitive to oxygen at the temperatures prevailing therein. Useful inert gases include for example nitrogen, helium, neon and argon and also mixtures thereof. The use of nitrogen is preferred. The kneader can be continuously flushed with the inert gas for example.

In a preferred embodiment of the present invention, step (b) comprises monomers and any dimers and higher oligomers escaping from the polyamide being at least partly collected and recycled into the production of the polyamide, preferably into step (a) of the process according to the present invention.

Treatment time in the kneader is varied according to the polyamide properties desired and ranges typically from five minutes to 24 hours, preferably from 0.25 to 12 hours, more preferably from 0.5 to four hours and even more preferably from 1 to 2 hours.

In one preferred embodiment step (b) is carried on until the relative viscosity of the polyamide has increased by not less than 10%, preferably by not less than 15% and more preferably by not less than 20%, based on the relative viscosity of the polyamide before step (b).

The relative viscosity of the polyamide is typically used as a measure of its molecular weight. Relative viscosity is determined according to the present invention at 25° C. as a solution in 96 weight percent $H_2SO_4$ with a concentration of 1.0 g of polyamide in 100 ml of sulfuric acid. The method of determining relative viscosity is in line with DIN EN ISO 307.

Step (c) comprises processing the polyamide from step (b) into pellet, film, fiber or moldings. Corresponding measures are known to a person skilled in the art. The polyamide is preferably pelletized. This is more particularly advantageous when the polyamide is to be subsequently extracted. To pelletize the polyamide, it is extruded, solidified and than pelletized. Underwater pelletization is a further method known in principle to a person skilled in the art.

Optionally, the polyamide obtained from step (c) is extracted and/or dried in step (d) of the process according to the present invention.

Extraction is to be understood as meaning that the level of monomers and any dimers and further oligomers in the polyamide is reduced by treating the polyamide with an extractant. Industrially, this can be accomplished, for example, by continuous or batchwise extraction with hot water (DE 2501348 A, DE 2732328 A) or in superheated steam (EP 0284968 W1). Pellet can be continuously extracted with countercurrent water at a temperature of 80 to 120° C. The extracted monomers and any dimers and higher oligomers are recovered and reused for ecological as well as economic reasons. Nylon-6 is advantageously extracted with caprolactam-containing water (WO 99/26996 A2).

A preferred embodiment of the process according to the present invention for producing polyamides from the corresponding monomers and/or prepolymers comprises the steps of (a) reacting the monomers and/or prepolymers and optionally further components under polyamide-forming reaction conditions to form polyamide,
(b) treating the polyamide obtained in step (a) in a kneader above the melting temperature of the polyamide,
(c) further processing the polyamide from step (b) into pellet, film, fiber or moldings, preferably pelletizing the polyamide,
(d) extracting some or all unconverted monomers and any product oligomers and also optionally further components from the polyamide and optionally drying the polyamide.

It is preferable according to the present invention for the extracted polyamide to be dried thereafter. The drying of polyamide is known in principle to a person skilled in the art. For example, the extracted pellet can be dried with a dry stream of nitrogen gas by countercurrent contact. A description of the drying of nylon-6 pellet appears in Becker/Braun at pages 69 to 70. Two drying systems are described therein—batch drying in the tumble dryer or cone dryer under reduced pressure and continuous drying in so-called drying tubes operated with inert gas, i.e., in the absence of oxygen. These drying processes can also be applied to other polyamides.

It is also possible for the polyamide just to be dried in step (d).

The process according to the present invention can be operated as a continuous or as a batch process, preferably it is carried out as a continuous process.

Exemplary embodiments of the present invention will now be more particularly described.

EXAMPLES 1a TO c

Treatment in Kneader

A melt of nonextracted nylon-6 produced by hydrolytic polymerization of caprolactam is continuously conveyed into a kneader (6.51 twin-screw kneader from List) and discharged after different average residence times. The particular temperature and average residence time is reported in Table 1 The gas space of the kneader was continuously flushed with nitrogen at ambient pressure. For each treated sample the relative viscosity was determined according to EN ISO 307:2007 using solutions of the polyamide with a concentration of 1 g per 100 ml of sulfuric acid at a concentration of 96 wt % and also the monomer content of the polyamide as per ISO 11337 with trifluoroethanol as solvent after treatment in the kneader as well as the relative viscosity and the monomer content of the untreated starting material. The percentages in the examples are all by weight.

TABLE 1

| Example | Temperature [° C.] | Residence time [h] | Relative viscosity | Monomer content [%] |
|---|---|---|---|---|
| starting material, not in accordance with invention | — | — | 2.3 | 9.8 |
| 1a | 240 | 1 | 2.8 | 6.5 |
| 1b | 270 | 1 | 3.5 | 4.5 |
| 1c | 290 | 2 | 3.9 | 6.1 |

EXAMPLE 2

Extraction of Polyamide after Treatment in Kneader 150 g polyamide pellet with a particle size of about 2 to 3 mm from Example 1c were extracted in a 2 l HWS vessel with hot completely ion-free water (flow rate 1 l/h) at 95° C. for 24 hours. The product was subsequently dried for four hours at 115° C. under nitrogen in a vacuum drying cabinet. The relative viscosity and the viscosity number were determined for the samples as described under Example 1 as well as the monomer content. Residual extractables, i.e., caprolactam monomer, dimer, timer, tetramer, pentamer, hexamer and heptamer, and the level of amino end groups and carboxyl end groups were also measured. Residual extractables was determined to ISO 6427 on unground pellet by extracting the pellet for 16 h. The amide end group content was determined potentiometrically using hydrochloric acid on a solution of the polyamide in a mixture of phenol and methanol. The carboxyl acid end group content was measured by titration with KOH in benzyl alcohol as solvent. The results are reported in Tables 2 a and b.

TABLE 2 a

| Example | VN [ml/g] | Relative viscosity | Monomer content [%] | RE [%] | AEG [mmol/kg] | CEG [mmol/kg] |
|---|---|---|---|---|---|---|
| 1c (before extraction) | 225 | 3.9 | 6.09 | 7.59 | 33.4 | 25 |
| 2 | 219 | 3.6 | 0.02 | 1.36 | 35 | 31 |

RE: residual extractables
AEG: amino end groups
CEG: carboxyl end groups

TABLE 2 b

| Example | Dimer [%] | Trimer [%] | Tetramer [%] | Pentamer [%] | Hexamer [%] | Heptamer [%] |
|---|---|---|---|---|---|---|
| 2 | 0.12 | 024 | 0.29 | 0.32 | 0.24 | 0.13 |

We claim:

1. A process for producing polyamides from the corresponding monomers and/or prepolymers comprising the steps of
   (a) reacting the monomers and/or prepolymers and optionally further components under polyamide-forming reaction conditions to form polyamide,
   (b) treating the polyamide obtained in step (a) in a kneader above the melting temperature of the polyamide to postcondense the polyamide,
   (c) further processing the polyamide from step (b) into pellet, film, fiber or moldings, and
   (d) extracting some or all unconverted monomers and any product dimers and oligomers and also optionally further components from the polyamide and/or drying the polyamide.

2. The process according to claim 1 wherein step (b) is carried out at temperatures of 180° C. to 340° C.

3. The process according to claim 1 wherein step (b) is carried out for 5 min to 24 hours and preferably for 30 min to 12 hours.

4. The process according to claim 1 wherein step (b) is carried on until the relative viscosity of the polyamide has increased by not less than 10%, based on the relative viscosity of the polyamide before step (b).

5. The process according to claim 1 wherein step (b) is carried out at a pressure of 0.01 bar absolute to 5 bar absolute.

6. The process according to claim 1 wherein step (b) is carried out under inert gas atmosphere.

7. The process according to claim 1 wherein the kneader used in step (b) is a single-shaft or a twin-shaft screw kneader, a co-kneader or a kneading reactor.

8. The process according to claim 1 wherein at least one viscosity reducer is added to the polyamide before step (b) or in step (b).

9. The process according to claim 1 wherein polyamides produced are selected from nylon-6, copolyamides constructed from nylon-6 foundational building blocks and further polyamide foundational building blocks, and polyamide copolymers whose polyamide fraction are constructed from nylon-6 foundational building blocks and optionally further polyamide foundational building blocks, wherein the proportion of nylon-6 foundational building blocks is in each case not less than 20 wt %, based on the total weight of polyamide-forming foundational building blocks.

10. The process according to claim 1 wherein a polyamide produced on the basis of nylon-6 is selected from polyamides, copolyamides and polyamide copolymers comprising not less than 60 wt % of nylon-6 foundational building blocks.

11. The process according to claim 1 wherein step (a) utilizes as lactam and/or prepolymers based on lactam optionally together with further monomers.

12. The process according to claim 1 wherein step (a) polymerizes lactams and/or prepolymers based on lactams and also optionally further monomers hydrolytically to polyamide.

13. The process according to claim 1 wherein step (a) utilizes caprolactam and/or prepolymers based on caprolactam optionally with further monomers.

14. The process according to claim 1 wherein step (b) recycles monomers and any dimers and oligomers escaping from the polyamide into step (a).

15. The process according to claim 1 which is operated as a continuous process.

16. The process according to claim 1, wherein step (b) is carried out in vacuo.

17. A process for producing polyamides from the corresponding monomers and/or prepolymers comprising the steps of
(a) reacting the monomers and/or prepolymers and optionally further components under polyamide-forming reaction conditions to form polyamide,
(b) postcondensing the polyamide obtained in step (a) in a kneader above the melting temperature of the polyamide,
(c) further processing the polyamide from step (b) into pellet, film, fiber or moldings, and
extracting some or all unconverted monomers and any product dimers and oligomers and also optionally further components from the polyamide and/or drying the polyamide.

* * * * *